US012786005B2

(12) United States Patent
Monnier et al.

(10) Patent No.: US 12,786,005 B2
(45) Date of Patent: Nov. 3, 2026

(54) COMMUNICATION GATEWAY WITH CONFIGURABLE FILTERING BETWEEN OPEN AND AVIONICS DOMAINS, RELATED AIRCRAFT, FILTERING METHOD AND COMPUTER PROGRAM

(71) Applicant: THALES, Meudon (FR)

(72) Inventors: Stéphane Monnier, Merignac (FR); Alexandre Noinski, Merignac (FR); Gilles Descargues, Toulouse (FR)

(73) Assignee: THALES, Meudon (FR)

( * ) Notice: Subject to any disclaimer, the term of this patent is extended or adjusted under 35 U.S.C. 154(b) by 155 days.

(21) Appl. No.: 18/755,949

(22) Filed: Jun. 27, 2024

(65) Prior Publication Data

US 2026/0058840 A1 Feb. 26, 2026

(51) Int. Cl.

*H04L 12/40* (2006.01)
*H04L 9/40* (2022.01)
*H04L 12/403* (2006.01)

(52) U.S. Cl.

CPC ...... *H04L 12/40032* (2013.01); *H04L 12/403* (2013.01); *H04L 63/02* (2013.01)

(58) Field of Classification Search

CPC .. H04L 12/40032; H04L 12/403; H04L 63/02
See application file for complete search history.

(56) References Cited

U.S. PATENT DOCUMENTS

2017/0251501 A1 8/2017 Batsakes et al.
2017/0295031 A1* 10/2017 Bush ........................ H04L 43/08
2018/0375747 A1* 12/2018 Bush ................... H04L 63/1433
2020/0067880 A1* 2/2020 Kim .................... H04L 63/0263

FOREIGN PATENT DOCUMENTS

EP 3585030 A1 12/2019

OTHER PUBLICATIONS

True Willard et al: "Cybersecurity for Flight Deck Data Exchange", 2021 IEEE/AIAA 40th Digital Avionics Systems Conference (DASC), IEEE, Oct. 3, 2021 (Oct. 3, 2021), pp. 1-13.
FR 2307071, INPI Rapport de Recherche Preliminaire, Jan. 9, 2024, 2 pages.

* cited by examiner

*Primary Examiner* — Esther B. Henderson
(74) *Attorney, Agent, or Firm* — Soquel Group LLC

(57) ABSTRACT

A communication gateway, on-board an aircraft and connected between electronic devices of an open domain and avionics systems of an avionics domain, includes a module for acquiring, from an electronic device, at least one data message intended for an avionics system, a module for filtering each respective acquired message, according to a set of filtering criteria which is selected, from a set of filtering criteria, depending upon a type of the message, and a transmission module for transmitting each validated message to the corresponding avionics system. At least one filtering criterion of the set is parameterized via a respective filter parameter, and at least one filter parameter is dependent on the recipient avionics system, being variable from one avionics system to another.

11 Claims, 2 Drawing Sheets

COMMUNICATION GATEWAY WITH CONFIGURABLE FILTERING BETWEEN OPEN AND AVIONICS DOMAINS, RELATED AIRCRAFT, FILTERING METHOD AND COMPUTER PROGRAM

CROSS-REFERENCE TO RELATED APPLICATIONS

This application is a U.S. non-provisional application claiming the benefit of French Application No. 23 07071, filed on Jul. 3, 2023, which is incorporated herein by reference in its entirety.

TECHNICAL FIELD OF THE INVENTION

The present invention relates to an electronic communication gateway intended to be carried on-board an aircraft, the aircraft including a communication installation compartmentalized into an avionics domain and an open domain, external to the avionics domain, the communication installation including a plurality of avionics systems belonging to the avionics domain and one or a plurality of electronic devices belonging to the open domain, the communication gateway being adapted to be connected between the electronic device(s) and the avionics systems. The gateway is then at the interface between the open domain and the avionics domain.

The invention further relates to an aircraft comprising such a communication gateway.

The present invention further relates to a method of filtering data message(s) within an avionics communication installation intended to be carried on-board an aircraft, the filtering method being implemented by such a communication gateway.

The invention further relates to a non-transitory computer-readable medium including a computer program comprising software instructions which, when executed by a computer, implement such a filtering method.

The invention relates more particularly to an aircraft, although applicable to any type of aircraft, such as a helicopter or a drone.

The invention relates more particularly to the field of cyber security in an avionics context.

BACKGROUND OF THE INVENTION

An aircraft conventionally includes avionics systems for assisting the piloting of the aircraft, such as a Flight Management System (FMS); a Flight Guidance (FG) system; a Flight Control System (FCS); etc. Such avionics systems exchange information with one another by means of a communication network of the aircraft, which are part of a communication installation within the aircraft, generally including other systems other than the avionics system. The communication installation comprises in particular systems implementing functions relating to the airline operating the aircraft, such as a Centralized Maintenance System (CMS); or a passenger cabin management system.

Avionics systems are grouped in a domain, called avionics domain, to which corresponds a safety level which is the highest of the aircraft communication installation so as to ensure that the operation of the functions implemented by the avionics systems is not likely to be disrupted by communications with equipment outside the avionics domain. The safety level required for other equipment is lower than the safety level required for the avionics domain.

The communication installation is e.g. as per the standard ARINC 811 which defines different domains having different safety levels in an aircraft communication installation, in particular: an ACD (Aircraft Control Domain) corresponding to the aforementioned avionics domain; an AISD (Airline Information Services Domain) comprising equipment implementing airline functions (maintenance, cabin management, etc.); and a PIESD (Passenger Information and Entertainment Services Domain) relating to entertainment and passenger information.

As per the standard ARINC 811, the safety level of the ACD corresponds to the highest safety level of the aircraft communication installation because the functions implemented by the equipment of the ACD could be essential for controlling the flight of the aircraft. The safety level of the AISD is lower than the safety level of the ACD, the functions implemented in the AISD being less essential, at least in the short term, for the control of the flight of the aircraft. The safety level of the PIESD is lower than the safety level of the AISD.

The invention then relates to the provision of information in the certified avionics domain, such as the ACD domain, from the uncertified open domain, in particular from the AISD domain.

The exchange of information from a domain with a lower safety level to a domain with a higher safety level is very strongly restricted so as not to compromise the safety of the domain with the higher safety level.

To meet the need for a safety gateway between the open domain and the avionics domain with a higher safety level, document EP 3 585 030 A1 describes a communication gateway comprising a barrier of a first type for filtering the information coming from the open domain so as to allow said information to enter a communication domain only if it corresponds to an authenticated communication, a barrier of a second type for filtering information transmitted from the communication domain to the avionics domain by performing at least one syntactic filtering of said information. The communication gateway is also configured to afterwards perform a semantic filtering of the information.

However, such a safety gateway is not optimal.

SUMMARY OF THE INVENTION

The goal of the invention is then to propose an electronic communication gateway intended to be carried on-board an aircraft, for further improving the filtering of messages coming from the open domain and intended for the avionics domain, in particular, to reduce the risk of cyber-attack aimed at causing a malfunction of avionics systems.

To this end, the subject-matter of the invention is an electronic communication gateway intended to be carried on-board an aircraft, the aircraft including a communication installation compartmentalized into an avionics domain and an open domain, external to the avionics domain, the communication installation including a plurality of avionics systems belonging to the avionics domain and one or a plurality of electronic devices belonging to the open domain,

- the communication gateway being adapted to be connected between the electronic device(s) and the avionics systems, the communication gateway comprising:
- an acquisition module configured to acquire, from an electronic device belonging to the open domain, at least one data message intended for an avionics system belonging to the avionics domain;
- a filtering module connected to the output of the acquisition module and configured to filter each respective acquired message, validating said message if said message meets a set of filtering criteria and blocking the message as soon as a filtering criterion of said set is not met; the set of filtering criteria being selected from a set of filtering criteria according to a type of said message;

a transmission module connected at the output of the filtering module and configured to transmit, to the corresponding recipient avionics system, each message validated by the filtering module;

at least one filtering criterion of said set is parameterized via a respective filter parameter, and at least one filter parameter dependent on the recipient avionics system, being variable from one avionics system to another.

The parameterization of at least one filtering criterion of said set via a respective filtering parameter then makes it possible to have configurable filtering for the communication gateway, and the fact that at least one filtering parameter depends on the recipient avionics system, by being variable from one avionics system to another, allows having a filtering suitable for each recipient avionics system. The filtering performed by the communication gateway is then optimized depending on each recipient avionics system.

According to other advantageous aspects of the invention, the communication gateway comprises one or a plurality of the following features, taken individually or according to all technically possible combinations:

the gateway further comprises an acquisition module configured to obtain, from an electronic device external to the gateway, a set of filtering parameters associated with the set of filtering criteria, the filtering module then being configured to filter each message according to the set of filtering criteria parameterized via the obtained set of filtering parameters;

each acquired data message includes a plurality of fields of different types, and the set of filtering criteria includes at least one filtering criterion depending on only one type of field, called a single-field criterion;

each single-field criterion being chosen from the group consisting of: a criterion based on a number of occurrences of a given type of field in the message; a criterion based on a number of occurrences of a given character in a given field of the message; and a criterion based on whether a value of a given field of the message belongs to a predefined range of values;

each acquired data message includes a plurality of fields of different types, and the set of filtering criteria includes at least one filtering criterion depending on a plurality of types of field at the same time, called a multi-field criterion;

at least one multi-field criterion being preferably based on a combination of a value of a primary field type of the message and a number of occurrences of a secondary field type of the message;

each acquired data message has a plurality of fields of different types, and the set of filtering criteria includes at least one field condition criterion in the message;

each condition criterion being selected from the group consisting of: a prohibition of a given type of field in the message; an obligation of a given type of field in the message; an exclusion of a first type of field from a second type of field in the message; and a verification of a given scheduling of certain fields in the message;

the set of filtering criteria includes at least two distinct types of criteria from the group of types of criteria consisting of: single-field criterion, multi-field criterion, and condition criterion;

the set of filtering criteria preferably including at least one single-field criterion, at least one multi-field criterion, and at least one condition criterion;

the avionics domain is a domain corresponding to the highest safety level on-board the aircraft;

the avionics domain being preferably the ACD according to the standard ARINC 811 of 20 Dec. 2005; and the set of filtering criteria includes a set of syntactic criteria and/or a set of semantic criteria;

each syntactic filtering being preferably chosen from the group consisting of: the belonging of the sender of the message to a list of authorized senders, the belonging of the recipient of the message to a list of authorized recipients, and the conformity of the message with one of the predefined authorized formats;

each semantic filtering being preferably chosen from the group consisting of: the belonging of one or a plurality of message data to a range of authorized values, the consistency of at least one datum of the message with respect to a predefined reference, and the consistency between at least two data of the message.

The invention further relates to an aircraft including a communication installation compartmentalized into an avionics domain and an open domain external to the avionics domain; a communication installation including a plurality of avionics systems belonging to the avionics domain, one or a plurality of electronic devices belonging to the open domain, and an electronic communication gateway connected between the electronic device(s) and the avionics systems, the communication gateway being as defined hereinabove.

The invention further relates to a method for filtering data message(s) within an avionics communication installation intended to be carried on-board an aircraft, the communication installation being compartmentalized into an avionics domain and an open domain, external to the avionics domain, and including a plurality of avionics systems belonging to the avionics domain and one or a plurality of electronic devices belonging to the open domain, the filtering method being implemented by an electronic communication gateway and comprising the following steps:

acquiring, from an electronic device belonging to the open domain, at least one data message intended for an avionics system belonging to the avionics domain;

filtering each respective acquired message, validating said message if said message meets a set of filtering criteria and blocking the message as soon as a filtering criterion of said set is not met; the set of filtering criteria being selected from a set of filtering criteria according to a type of said message;

transmitting each validated message to the corresponding avionics system; and at least one filtering criterion of said set is parameterized via a respective filter parameter, and at least one filter parameter dependent on the recipient avionics system, being variable from one avionics system to another.

The invention further relates to a non-transitory computer-readable medium including a computer program including software instructions which, when executed by a computer, implement a filtering method as defined hereinabove.

BRIEF DESCRIPTION OF THE DRAWINGS

Such features and advantages of the invention will become clearer upon reading the following description, given only as a non-limiting example, and made with reference to the enclosed drawings, wherein.

DETAILED DESCRIPTION

The expression "substantially equal to" and "on the order of" define a relation of equality within plus or minus 20%, preferably within plus or minus 10%, else preferably within plus or minus 5%.

Figure 1:
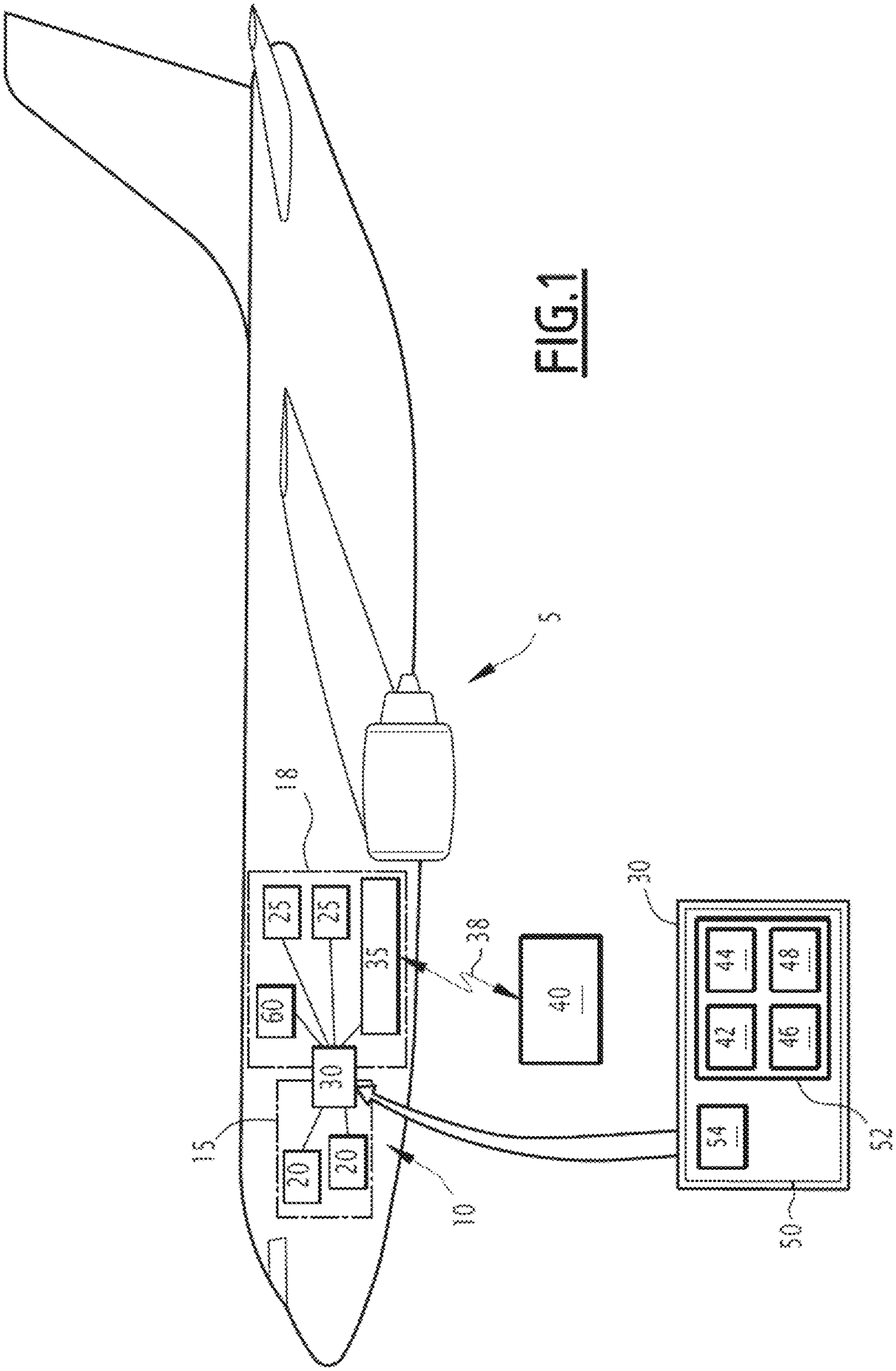
FIG. 1 is a schematic representation of an aircraft according to the invention comprising a communication installation compartmentalized into an avionics domain and an open domain external to the avionics domain; the communication installation including a plurality of avionics systems belonging to the avionics domain, one or a plurality of electronic devices belonging to the open domain, and an electronic communication gateway connected between the electronic device(s) and the avionics systems.

In FIG. 1, an aircraft 5 comprises a communication installation 10 compartmentalized in one avionics equipment 15 and at least one device 18 external to the avionics domain 15.

The communication installation 10 includes a plurality of avionics systems 20 belonging to the avionics domain 15; as well as one or a plurality of electronic devices 25, external to the avionics domain 15 and belonging to the open domain 18; and an electronic communication gateway 30 connected between the electronic device or devices 25 and the avionics systems 20. In the example shown in FIG. 1, the communication installation 10 includes a plurality of electronic devices 25, each belonging to the open domain 18.

In addition, the communication installation 10 further comprises a communication server 35 communicating via a communication link 38 with at least one electronic equipment 40 external to the aircraft 5.

The avionics domain 15 is a domain corresponding to the highest safety level on-board the aircraft 5, more particularly the highest safety level required by the communication system 10 of the aircraft 5.

The avionics domain 15 is then a domain for limiting a risk of disturbance—by at least one communication with the at least one device external to the avionics domain 15—of function(s) implemented by the at least one system 20 of the avionics domain 15. The avionics domain 15 includes the avionics system(s) 20.

The avionics domain 15 is typically the ACD according to the standard ARINC 811 of 20 Dec. 2005.

The open domain 18 is a domain to which corresponds a lower safety level than the safety level of the avionics domain 15. The open domain 18 includes the external device(s) 25.

Each avionics system 20 is carried on-board the aircraft 5 and belongs to the avionics domain 15. Each system 20 is known per se, is also called avionics calculator, and is configured for implementing one or a plurality of respective avionics functions.

Each avionics equipment 20 is, e.g., chosen from the group consisting of: a Flight Management System (FMS) of the aircraft; a Flight Guidance (FG) system; a Flight Control System (FCS); a satellite positioning system (Global Navigation Satellite System), such as a GPS (Global Positioning System); an IRS (Inertial Reference System); an ILS (Instrument Landing System) or an MLS (Microwave Landing System); a ROPS (Runway Overrun Prevention System); and an RA denoted RA (RadioAltimeter).

Each electronic device 25 belonging to the open domain 18 does not implement a respective avionics function, and thus generally does not require a specific certification.

The electronic communication gateway 30, hereinafter called the communication gateway 30 or else gateway 30, is at the interface between the open domain 18 and the avionics domain 15. A data message transmitted between the open domain 18 and the avionics domain 15, i.e., from the open domain 18 to the avionics domain 15, or vice versa from the avionics domain 15 to the open domain 18, then necessarily transits through the communication gateway 30.

The communication gateway 30 is also called a safety gateway and is configured to perform at least one filtering of a data message intended for a respective avionics system 20.

The communication gateway 30 comprises an acquisition module 42 for acquiring at least one data message intended for an avionics system 20; a module 44 for filtering each respective acquired message, validating said message if said message meets a set of filtering criteria and blocking the message as soon as a filtering criterion of said set is not met, the filtering module 44 being connected to the output of the acquisition module 42; and a module 46 for transmitting each message validated by the filtering module 44 to the corresponding avionics system 20, the transmission module 46 being connected to the output of the filtering module 44. A person skilled in the art would understand that a set of filtering criteria refers to a group of filtering criteria or a batch of filtering criteria, i.e., a set of one or a plurality of filtering criteria.

As an optional supplement, the gateway 30 further comprises a module 48 for acquiring a set of filtering parameters associated with the set of filtering criteria. A person skilled in the art would understand that a set of filtering parameters refers to a group of filtering parameters, or a batch of filtering parameters, i.e., a set of one or a plurality of filtering parameters.

The communication gateway 30 comprises, e.g., an information processing unit 50 typically consisting of a memory 52 and of a processor 54 associated with the memory 52.

According to such example, the acquisition module 42, the filtering module 44, the transmission module 46, as an optional supplement, and the acquisition module 48 are each produced in the form of a software program, or a software brick, which can be run by the processor 54. The memory 52 of the communication gateway 30 is then adapted to store software for acquiring at least one data message intended for an avionics system 20; software for filtering each respective acquired message; and software for transmitting each message validated by the filtering software, to the corresponding avionics system 20. As an optional supplement, the memory 52 of the communication gateway 30 is adapted to store software for acquiring the set of filtering parameters associated with the set of filtering criteria. The processor 54 of the communication gateway 30 is then adapted to execute each of the software programs among the acquisition software program, the filtering software program and the transmission software program as well as, as an optional supplement, the acquisition software program.

In a variant (not shown), the acquisition module 42, the filtering module 44, the transmission module 46 and, as an optional supplement, the acquisition 48 are each produced in the form of a programmable logic component, such as an FPGA (Field Programmable Gate Array), or else of an integrated circuit, such as an ASIC (Application Specific Integrated Circuit).

When the communication gateway 30 is produced in the form of one or a plurality of software programs, i.e., in the form of a computer program, also called a computer program product, it is further adapted to be recorded on a computer-readable medium (not shown). The computer-readable medium is e.g., a medium adapted to store the electronic instructions and to be coupled to a bus of a computer system. As an example, the readable medium is an optical disk, a magneto-optical disk, a ROM memory, a RAM memory, any type of non-volatile memory (e.g., EPROM, EEPROM, FLASH, NVRAM), a magnetic card or an optical card. A computer program containing software instructions is then stored on the readable medium.

The communication server 35 is configured to communicate via the communication link 38 with the at least one external electronic equipment device 40, said at least one external electronic equipment device 40 being, e.g., a ground station, or cloud computing equipment. The communication server 35 is preferentially connected to the communication gateway 30. The communication server 35 typically belongs to the open domain 18.

The communication server 35 is known per se and includes in particular a transceiver, not shown, compatible with the communication link 38. The communication link 38 is typically a radio link, i.e., a radio wave link, such as a satellite link. The transceiver is then a radio frequency transceiver.

The external electronic equipment device 40 is typically connected to a computer infrastructure of an operational control center, also called the OCC. The external electronic equipment device 40 is then advantageously configured to transmit data, such as, e.g., a flight plan of the aircraft 5 and information relating to the aircraft 5, such as the weight, the configuration, the balancing of the aircraft, or even the identifier thereof.

The acquisition module 42 is configured to acquire, from an electronic apparatus 25 belonging to the open domain 18, at least one data message intended for a respective avionics system 20 belonging to the avionics domain 15. The electronic device 25, from which the message is acquired, is typically the communication server 35, if the message is sent from the external electronic equipment 40.

The acquisition module 42 is, e.g., configured to acquire each message according to a respective avionics communication protocol.

The avionics communication protocol is, e.g., chosen from the group consisting of: a protocol as per the standard ARINC 702; a protocol as per the standard ARINC 739; a protocol as per the standard ARINC 619; a protocol as per the standard ARINC 429; and a protocol as per the standard FANS standard (Future Air Navigation System) associated with EUROCAE ED-100.

Each acquired data message comprises a header and a payload part, containing the data payload of the message, i.e., the data to be transmitted to the corresponding avionics system 20.

The header typically comprises a preamble used for synchronizing the message, and further including e.g. a delimiter to indicate the beginning of the information in the message; an indication of the destination, such as a recipient address, i.e. an address or an identifier of the avionics system 20 to which the message is sent; an indication of the source, such as a source address, i.e. an address or identifier of the sender of the message; and a check code, such as a Cyclic Redundancy Check (CRC) code.

The payload part of the message includes a plurality of fields, the payload part being subdivided, i.e., broken down into a plurality of successive portions, each portion of payload forming a respective field. The payload part of the message generally includes a plurality of fields of different types, and the types typically depend on the avionics communication protocol.

Field type refers to a type of quantity represented by the field, i.e., the type of quantity the value of which is contained in said field. For each field, each avionics communication protocol defines the type of the field, generally along with a naming of said type, and a range of values associated with said type. For example, in the standard ARINC 702 defining the content of messages typically containing flight plans, the different types of fields correspond to different types of quantities associated with waypoints of the flight plan, such as a way of passing a waypoint, a latitude of the waypoint, a longitude of the waypoint, a way to reach the waypoint, etc.

For example, according to the standard ARINC 702, field types are defined by identifiers (TAG) in the message, or else by the positioning thereof in the message according to an order defined in the standard.

Examples of field types for the protocol as per the standard ARINC 702 are then as follows: a latitude of the waypoint, a longitude of the waypoint, a way to pass a waypoint, a way to reach the waypoint, an airport of departure, an airport of arrival.

For example, according to the standard ARINC 739, each type specifies an encoding of the bit values of an ARINC 429 label among a plurality of possible distinct encodings of said bit values.

Examples of field types for the protocol as per the standard ARINC 739 are then the following: COLOR; LINE NUMBER; FUNCTION; and INITIAL CHARACTER POSITION.

For example, according to the standard ARINC 619, field types are defined by the position thereof relative to other fields in the message.

Examples of field types for the protocol as per the standard ARINC 619 are then the following: Departure Station; Scheduled Date of flight.

For example, as per the standard ARINC 429, field types are defined by the positioning thereof in the message, typically 32 bits. The allocation of bits and fields changes depending on the value of the "Label" field associated with the first 8 bits of the 32-bit word, and potentially on the value of another field specifying how to interpret the sequence of bits of the 32-bit word.

Examples of field types for the protocol as per the standard ARINC 429 are then as follows: a position of the aircraft (SV position X); a Reference Air speed.

The filtering module 44 is configured to filter each respective acquired message, by validating said message if said message meets a set of filtering criteria and by blocking the message as soon as a filtering criterion of said set is not met. The set of filtering criteria is selected from a set of filtering criteria, depending on a type of the message.

Validating the message means accepting the message, i.e., authorizing the message for transmission to the avionics domain 15. By filtering the messages via the filtering module 44, the communication gateway 30 fulfills a cybersecurity function. In other words, the communication gateway 30 then forms a security barrier between the open domain 18 and the avionics domain 15. In other words, the entry of message(s) within the avionics domain 15 is secured via the filtering performed by the communication gateway 30, more particularly by the filtering module 44.

Blocking the message means refusing the message, i.e., prohibiting the transmission of the message to the avionics domain 15. The filtering module 44 is then typically configured to block a message that does not meet a filtering criterion of said set, by deleting said message. As an optional supplement, the filtering module 44 is also configured to keep a log of each blocked message, before the deletion of said message.

According to the invention, at least one filtering criterion of said set is parameterized via a respective filtering parameter, and at least one filtering parameter depends on the recipient avionics system 20, being variable from one avionics system 20 to another. The filtering module 44 is then configured to determine the avionics system 20 which is the recipient of the message to be filtered, e.g., from the indication relating to the destination contained in the header of the message; then to use the filtering parameter or parameters associated with said recipient avionics system 20.

The set of filtering criteria typically includes at least one filtering criterion depending on only one type of field, called a single-field criterion.

Each single-field criterion is, e.g., chosen from the group of criteria consisting of: a criterion based on a number of occurrences of a given type of field in the message; a criterion based on a number of occurrences of a given character in a given field of the message; and a criterion based on whether a value of a given field of the message belongs to a predefined range of values.

When the filtering criterion is the criterion based on the number of occurrences of a given type of field in the message, the filtering parameter associated with said criterion is typically a value or range of values of said number of occurrences, or a value of the given type of field, i.e., a parameter defining the given type of field.

The criterion based on the number of occurrences of a given type of field corresponds, e.g., to the number of waypoints in a flight plan message, the filtering module 44 being then configured to check that the number of waypoints contained in the flight plan message is less than a predefined or parameterized maximum value, and/or is greater than a predefined or parameterized minimum value.

When the filtering criterion is the criterion based on the number of occurrences of a given character in a given field of the message, the filtering parameter associated with said criterion is typically a value or range of values of said number of occurrences, or a value of the given character, i.e., a parameter defining said given character.

The criterion based on the number of occurrences of a given character in a given field corresponds, e.g., to the calculation of a number of characters "." in a request associated with SNMP (Simple Network Management Protocol) requesting information about an o Object Identifier (OID), the filtering module 44 then being configured to check that the number of "." in the OID is less than a predefined or parameterized maximum value, and/or is greater than a predefined or parameterized minimum value. The encoded OID of the form "1.3.6.1.4.1.2680.1.2.7.3.2.1" contains, e.g., 12 characters "." and the number of occurrences of the character "." is then equal to 12.

When the filtering criterion is the criterion based on whether a value of a given field of the message belongs to a predefined range of values, the filtering parameter associated with said criterion is typically a parameter defining the given type of field, or else said range of values to which is tested whether said value belongs.

The criterion based on whether a value of a given field belongs to a predefined range of values corresponds, e.g., to received frequencies compatible with the capacities of the recipient avionics system 20, the filtering module 44 then being configured to check that said received frequencies belong to the predefined range of frequency values.

In addition or in a variant, the set of filtering criteria typically includes at least one filtering criterion depending on a plurality of types of field at the same time, called a multi-field criterion.

At least one multi-field criterion is, e.g., based on the combination of a value of a primary type of field of the message and a number of occurrences of a secondary type of field of the message, the secondary type being distinct from the primary type.

The multi-field criterion serves, e.g., to check that a text to be displayed is compatible with the display capacity of a screen of the recipient avionics system 20, the multi-field criterion then taking into account the display start position, corresponding to the primary type, and the number of characters to be displayed, the character to display corresponding to the secondary type. The filtering module 44 is then configured to check that the combination of the two quantities is compatible with said display capacity.

In the aforementioned examples, the predefined value ranges are preferably determined depending on a predefined field of use for the recipient avionics system 20, i.e., depending on the predefined capacities for the recipient avionics system 20.

In addition or in a variant, the set of filtering criteria includes at least one field condition criterion in the message.

For example, each condition criterion is chosen from the group consisting of: a prohibition of a given type of field in the message; an obligation of a given type of field in the message; an exclusion of a first type of field from a second type of field in the message; and a check of a given order of certain fields in the message. In other words, each condition criterion corresponds, e.g., to a condition chosen from the group consisting of: a presence condition, an absence condition, a mutual exclusion condition, and an order condition.

The condition criterion corresponds, e.g., to the simultaneous non-presence of the RP and RI fields in a message as per the standard ARINC 702, the RP field defining an active route, and the RI field defining an inactive route.

In addition still, the set of filtering criteria includes at least two distinct types of criteria from the group of criteria types consisting of: single-field criterion, multi-field criterion, and condition criterion.

According to said addition, the set of filtering criteria preferably includes at least one single-field criterion, at least one multi-field criterion, and at least one condition criterion; i.e., at least one criterion of each of the aforementioned types.

In addition to the filtering dependent on the recipient avionics system 20 and variable from one avionics system 20 to another, the filtering module 44 is configured to implement a variability of the filtering according to a use case. The filtering module 44 is, e.g., configured to implement this variability depending on the use case by varying the set of filtering criteria as a function of a use case, typically via a number of filtering criteria increasing with the severity of the use case, i.e., with increased security for the use case. As a variant or in addition, the filtering module 44 is, e.g., configured to implement the variability depending on the use case by varying the set of filtering parameter(s)

according to a use case, typically via more restrictive filter parameter(s) value ranges when the use case is more severe or more security-related.

Examples of use cases are the following, sorted in ascending order of a filtering level:

- development case, also called design case, with minimal filtering;
- maintenance cases, with reduced filtering;
- nominal operational case, with nominal filtering;
- security operational case, e.g., in the presence of an alert of cyberattacks or cyber intrusion, with maximum filtering, or even a temporary prohibition on any message coming from the open domain 18.

The transmission module 46 is configured to transmit, to the corresponding avionics system 20, each message validated by the filtering module 44.

The transmission module 46 is typically configured to transmit each validated message to the corresponding avionics system 20, according to the respective avionics communication protocol, i.e., the avionics communication protocol corresponding to the protocol according to which the message was previously acquired by the acquisition module 42.

As an optional supplement, the acquisition module 48 is configured to obtain the set of filtering parameters associated with the set of filtering criteria.

According to said optional supplement, the filtering module 44 is then configured to filter each message according to the set of filtering criteria parameterized via the set of filtering parameters obtained by the acquisition module 48.

According to said optional supplement, the acquisition module 48 is, e.g., configured to obtain said set of filtering parameter(s) from an electronic device 60 external to the gateway 30. Advantageously, the acquisition module 48 is configured to check an authentication certificate and/or an integrity certificate for each set of filtering parameter(s), and then to validate a respective set of filtering parameter(s) only if the authentication certificate and/or the integrity certificate of said set are valid.

The authentication certificate checks that the respective set of filter parameter(s) is an authentic set issued from a recognized source, and not a malicious set issued from an attacking source. The authentication certificate is, e.g., a 4096-bit RSA certificate.

The certificate of integrity checks that the respective set of filtering parameter(s) is an intact set that has not been corrupted during the transmission thereof from the electronic device 60. The integrity certificate is, e.g., an SHA-2 (Secure Hash Algorithm) certificate.

The electronic device 60 is connected to the communication gateway 30. The electronic device 60 is typically included in the open domain 18, and is easily accessible by a user, in order to be able to store in a memory (not shown) of said device 60, new sets of filtering parameter(s) and/or modify one or a plurality of sets of filtering parameter(s) already stored in the memory. The user is typically a member of the crew of the aircraft 5, such as the pilot of the aircraft 5, or else an operator configuring the aircraft 5 prior to flight.

Figure 2:
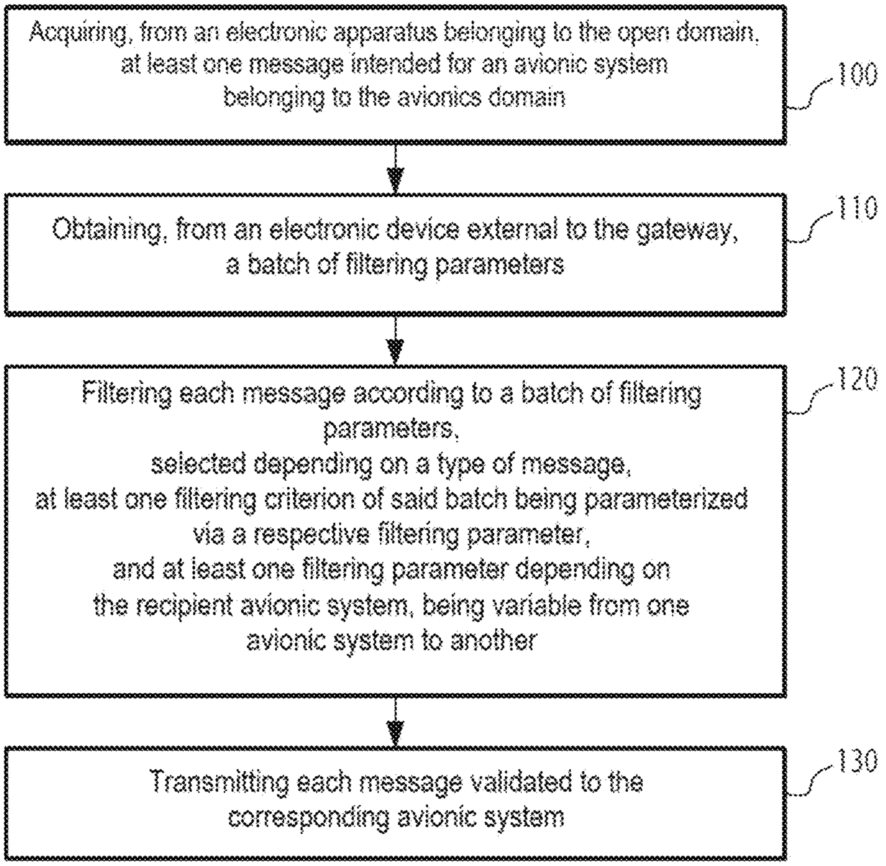
FIG. 2 is an organization chart for a method according to the invention, for filtering the data message(s) within the installation of avionics communication shown in FIG. 1, the method being implemented by the electronic communication gateway.

The operation of the communication gateway 30 according to the invention will now be described with reference to FIG. 2 representing a flowchart of the method for filtering data message(s) within the avionics communication installation 10, said filtering method being implemented by the communication gateway 30.

During an initial step 100, the communication gateway 30 acquires, via the acquisition module 42 thereof and from a respective electronic apparatus 25 belonging to the open domain 18, at least one data message intended for a respective avionics system 20 belonging to the avionics domain 15.

Optionally, at the end of the acquisition step 100, or in a variant (not shown) prior to the acquisition step 100, the communication gateway 30 obtains, via the acquisition module 48 thereof and from the electronic device 60, at least one set of filter parameter(s) associated with the set of filtering criteria corresponding to the type of the at least one acquired message.

A person skilled in the art would then understand that the optional acquisition step 110 serves to take into account a set of filtering parameters that would not be stored beforehand in the communication gateway 30.

The communication gateway 30 then moves to the filtering step 120 during which it filters, via the filtering module 44 thereof, each respective acquired message by validating said message if the message meets a set of filtering criteria and blocking said message as soon as a filtering criterion of said set is not met, the set of filtering criteria being selected according to the type of said message and among the set of filtering criteria.

According to the invention, during the filtering step 120, at least one filtering criterion of said set is parameterized via a respective filtering parameter, and at least one filtering parameter depends on the recipient avionics system 20, preferably varying from one avionics system 20 to another.

Advantageously, each filtering criterion is a criterion of the type chosen from among the previously described criteria, namely single-field criterion, multi-field criterion, and condition criterion.

At the end of the filtering step 120, the communication gateway 30 transmits, via the transmission module 46 thereof and to the recipient avionics system 20, the message acquired during the acquisition step 100 if the message was subsequently validated during the filtering step 120, i.e., if the message met the selected set of filtering criteria.

The selective and variable filtering depending on the recipient avionics system 20 then serves to adapt the filtering performed, to each recipient avionics system 20 of a message, and more particularly to check that the message intended for a respective avionics system 20 is compatible with said avionics system 20, in particular with the capacity(ies) of said avionics system 20. The filtering is then aimed in particular at preventing the transmission of the message intended for the respective avionics system 20 from saturating said avionics system 20.

For example, if the filtering module 44 is configured to check that the number of waypoints contained in the flight plan message is less than a maximum value, and if an avionics system 20, denoted by A, supports only a maximum of 200 waypoints, while an avionics system 20, denoted by B, supports 256 waypoints, then the communication gateway 30 according to the invention serves both to check that the number of waypoints contained in the flight plan will not exceed the capacity of the recipient avionics system 20, and to have a maximum value for said number of crossing points variable from one avionics system 20 to another, and thereby adjusted as best as possible to the capacity of each avionics system 20, with e.g. a maximum value equal to 200 for system A, and equal to 256 for system B.

It should thereby be understandable that the communication gateway 30 according to the invention serves to further improve the filtering of messages coming from the open domain 18 intended for the avionics domain 15, in particular to reduce a risk of cyberattack aimed at causing a malfunctioning of certain avionics systems 20.

The invention claimed is:

1. An electronic communication gateway comprising a processor and memory and carried on-board an aircraft, the aircraft including a communication installation compartmentalized into an avionics domain and an open domain, external to the avionics domain, the communication installation including a plurality of avionics systems belonging to the avionics domain and one or more electronic devices belonging to the open domain, the communication gateway being connected between the electronic device(s) and the avionics systems, the communication gateway comprising:

an acquisition module acquiring, from an electronic device belonging to the open domain, at least one data message intended for a recipient avionics system belonging to the avionics domain;

a filtering module connected at the output of said acquisition module and filtering each respective acquired message, validating the message if the message meets a set of filtering criteria and blocking the message as soon as a filtering criterion of the set is not met to prevent saturation of the recipient avionics system, the set of filtering criteria being selected from a set of filtering criteria according to a type of the message, wherein at least one filtering criterion of the set is parameterized via a respective filtering parameter, and at least one filtering parameter is specifically configured for the recipient avionics system, being variable from one avionics system to another based on respective capacities of each recipient avionics system; and a transmission module connected to the output of said filtering module and transmitting, to the recipient avionics system, each message validated by said filtering module.

2. The gateway according to claim 1, further comprising a second acquisition module obtaining, from an electronic device external to the gateway, a set of filtering parameters associated with the set of filtering criteria, said filtering module then filtering each message according to the set of filtering criteria parameterized via the obtained set of filtering parameters.

3. The gateway according to claim 1, wherein each acquired data message includes a plurality of fields of different types, and the set of filtering criteria includes at least one filtering criterion dependent on only one type of field, called single-field criterion, each single-field criterion being chosen from the group consisting of: a criterion based on a number of occurrences of a given type of field in the message, a criterion based on a number of occurrences of a given character in a given field of the message, and a criterion based on whether a value of a given field of the message belongs to a predefined range of values.

4. The gateway according to claim 1, wherein each acquired data message includes a plurality of fields of different types, and the set of filtering criteria includes at least one filtering criterion dependent on a plurality of field types at a time, referred to as a multi-field criterion.

5. The gateway according to claim 4, what least one multi-field criterion is based on a combination of a value of a primary field type of the message and a number of occurrences of a secondary field type of the message.

6. The gateway according to claim 1, wherein each acquired data message includes a plurality of fields of different types, and the set of filtering criteria includes at least one field condition criterion in the message, each condition criterion being selected from the group consisting of: a prohibition of a given type of field in the message, an obligation of a given type of field in the message, an exclusion of a first type of field from a second type of field in the message, and a verification of a given scheduling of certain fields in the message.

7. The gateway according to claim 6, wherein each acquired data message includes a plurality of fields of different types, and the set of filtering criteria includes at least one filtering criterion dependent on only one type of field, referred to as a single-field criterion, wherein each acquired data message includes a plurality of fields of different types, and the set of filtering criteria includes at least one filtering criterion dependent on a plurality of field types at a time, referred to as a multi-field criterion, and wherein the set of filtering criteria includes at least two distinct types of criteria from the group of types of criteria consisting of: single-field criterion, multi-field criterion, and condition criterion.

8. The gateway according to claim 7, wherein the set of filtering criteria includes at least one single-field criterion, at least one multi-field criterion, and at least one condition criterion.

9. The gateway according to claim 1, wherein the avionics domain is a domain corresponding to a highest safety level on-board the aircraft.

10. An aircraft comprising a communication installation compartmentalized into an avionics domain and an open domain external to the avionics domain, the communication installation comprising:

a plurality of avionics systems belonging to the avionics domain;

one or a plurality of electronic devices belonging to the open domain; and an electronic communication gateway connected between said one or a plurality of electronic devices and said avionics systems, the electronic communication gateway comprising:

an acquisition module acquiring, from one of said one or a plurality of electronic devices belonging to the open domain, at least one data message intended for a recipient avionics system belonging to the avionics domain;

a filtering module connected at the output of said acquisition module and filtering each respective acquired message, validating the message if the message meets a set of filtering criteria and blocking the message as soon as a filtering criterion of the set is not met to prevent saturation of the recipient avionics system, the set of filtering criteria being selected from a set of filtering criteria according to a type of the message, wherein at least one filtering criterion of the set is parameterized via a respective filtering parameter, and at least one filtering parameter is specifically configured for the recipient avionics system, being variable from one avionics system to another based on respective capacities of each recipient avionics system; and a transmission module connected to the output of said filtering module and transmitting, to the recipient avionics system, each message validated by said filtering module.

11. A method for filtering data message(s) within an avionics communication installation carried on-board an aircraft, the communication installation being compartmentalized into an avionics domain and an open domain, external to the avionics domain, and including a plurality of avionics systems belonging to the avionics domain and one or a plurality of electronic devices belonging to the open domain, the filtering method being implemented by an electronic communication gateway and comprising:

acquiring, from an electronic device belonging to the open domain, at least one data message intended for a recipient avionics system belonging to the avionics domain;

filtering each respective acquired message;

validating the message if the message meets a set of filtering criteria;

blocking the message as soon as a filtering criterion of the set is not met to prevent saturation of the recipient avionics system, the set of filtering criteria being selected from a set of filtering criteria according to a type of the message, wherein at least one filtering criterion of the set is parameterized via a respective filtering parameter, and at least one filtering parameter is specifically configured for the recipient avionics system, being variable from one avionics system to another based on respective capacities of each recipient avionics system; and transmitting each validated message to the corresponding avionics system.

* * * * *